(12) United States Patent
Grosso

(10) Patent No.: US 12,448,031 B2
(45) Date of Patent: Oct. 21, 2025

(54) ELECTRIC POWER STEERING SYSTEM REDUCER AND ELECTRIC POWER STEERING SYSTEM

(71) Applicant: JTEKT EUROPE, Irigny (FR)

(72) Inventor: Sylvain Grosso, Lyons (FR)

(73) Assignee: JTEKT EUROPE, Irigny (FR)

( * ) Notice: Subject to any disclaimer, the term of this patent is extended or adjusted under 35 U.S.C. 154(b) by 529 days.

(21) Appl. No.: 17/925,208

(22) PCT Filed: May 11, 2021

(86) PCT No.: PCT/FR2021/050815
§ 371 (c)(1),
(2) Date: Nov. 14, 2022

(87) PCT Pub. No.: WO2021/229175
PCT Pub. Date: Nov. 18, 2021

(65) Prior Publication Data
US 2023/0192179 A1 Jun. 22, 2023

(30) Foreign Application Priority Data

May 13, 2020 (FR) .................................. 2004727

(51) Int. Cl.
*B62D 5/04* (2006.01)
(52) U.S. Cl.
CPC .................................. *B62D 5/0454* (2013.01)
(58) Field of Classification Search
CPC .. B62D 5/0454; B62D 5/0409; B62D 5/0421; B62D 3/04; B62D 5/04; F16H 2057/0213
See application file for complete search history.

(56) References Cited

U.S. PATENT DOCUMENTS

| 6,269,709 B1 * | 8/2001 | Sangret ..................... F16H 1/16 |
| | | 74/400 |
| 2012/0227526 A1 * | 9/2012 | Lescorail .............. F16H 57/022 |
| | | 74/406 |

(Continued)

FOREIGN PATENT DOCUMENTS

| DE | 102013226842 A1 | 6/2015 |
| EP | 2 597 014 A2 | 5/2013 |
| KR | 20100055018 A * | 7/2018 ........... B62D 5/0454 |

OTHER PUBLICATIONS

Sep. 9, 2021 International Search Report issued in International Patent Application No. PCT/FR2021/050815.
(Continued)

Primary Examiner — Paul N Dickson
Assistant Examiner — Matthew D Lee
(74) Attorney, Agent, or Firm — Oliff PLC

(57) ABSTRACT

Reducer device having electric power steering, including a support member, an endless screw, a toothed wheel that meshes with a helical spline arranged on the endless screw, the endless screw including a first end capable of being rotated, and a second end receiving a first rotation-guiding means and a second rotation-guiding means, respectively, causing the endless screw to pivot relative to the support member, the second rotation-guiding means including a damping sleeve and a rotation-guiding device, the sleeve surrounding the rotation-guiding device, the second rotation-guiding means including a centering means including a press-fitting part inserted into the rotation-guiding device, and an attachment part rigidly connected to the support member.

9 Claims, 4 Drawing Sheets

(56) References Cited

U.S. PATENT DOCUMENTS

| | | | | |
|---|---|---|---|---|
| 2013/0126260 A1* | 5/2013 | Kim | ...................... | B62D 5/0409 |
| | | | | 180/444 |
| 2016/0201760 A1* | 7/2016 | Kwon | ...................... | F16H 55/24 |
| | | | | 74/409 |
| 2019/0337554 A1* | 11/2019 | Park | ...................... | B62D 5/0454 |
| 2022/0001917 A1* | 1/2022 | Zimmermann | ......... | F16C 23/06 |
| 2022/0041205 A1* | 2/2022 | Zimmermann | ...... | B62D 5/0454 |
| 2022/0371652 A1* | 11/2022 | Möller | .................... | F16C 27/04 |
| 2023/0027923 A1* | 1/2023 | Rosenthal | ............ | B62D 5/0409 |
| 2023/0234635 A1* | 7/2023 | Moon | ..................... | F16C 33/74 |
| | | | | 180/443 |
| 2024/0034392 A1* | 2/2024 | Ko | ........................... | B62D 3/10 |

OTHER PUBLICATIONS

Sep. 9, 2021 Written Opinion issued in International Patent Application No. PCT/FR2021/050815.

\* cited by examiner

ELECTRIC POWER STEERING SYSTEM REDUCER AND ELECTRIC POWER STEERING SYSTEM

The present invention relates to the field of electric power assist steering systems for vehicle. Throughout the remainder of the description, the name "electric power steering system" refers to an electric power assist steering system for vehicle.

More particularly, the invention relates to a reduction device of an electric power steering system, to an electric power steering system, and to a power-driven vehicle equipped with an electric power steering system.

Typically, and as shown in FIG. 1, an electric power steering system 1 consists in particular of a steering column assembly 2 consisting for example of an upper steering column 3 connected to a lower steering column 4 through an universal joint 5, and an electric power steering device 6.

The upper steering column 3 bears at an end part 7 a directional steering wheel 8, and the lower steering column 3 bears at an end part a steering pinion (not visible on the figures) intended to be engaged on a rack 9. The application of a torque by the steering column assembly 2 to the steering pinion has the effect of allowing the translation of the rack 9, which causes the wheels of the vehicle to rotate (not shown on the figures) by means of tie rods 10 hinged to the ends of the rack 9.

The electric assist device 6 includes a motor 11 rotatably driving, for example, a rotating shaft 12, connected to a reduction device 13. The motor 11 is controlled by a control unit 14 (for example an electronic board), according to information provided by signals form sensors (not shown on the figures) disposed for example on the steering column assembly 2. Such a motor 11 supplies an assist torque, depending on the information received by the sensors, which assist torque is transmitted to the steering column assembly 2 through the reduction device 13, and is added to the torque exerted by the user on the steering wheel 8. In this way, the force exerted by the user necessary to pivot the wheels is reduced, which facilitates handling of the directional steering wheel 8.

In order to transmit the assist torque to the steering column, the motor is connected to the reduction device 13, being coupled to a worm screw provided with a helical spline within which a toothed wheel meshes (also called reduction wheel). The toothed wheel is integral with the pinion or to the shaft carrying the pinion. The toothed wheel and the worm screw are generally enveloped by a protective casing, made of a metal alloy.

However, such a reduction device has drawbacks. It has thus been observed that there is a parasitic play between the toothed wheel and the helical spline, which appears for example due to the wear of the toothed wheel, or during temperature variations. However, such a parasitic play generates noise, and deleterious vibrations at the steering column assembly 1.

The patent EP 2797014 (JTEKT) provides an electric power steering reducer consisting of a worm shaft pivotably mounted relative to a housing, using ball bearings provided at each of its ends. One end of the worm screw is driven by the electric motor, another free end is connected to a pushing mechanism intended to reduce the play between the worm screw and the toothed wheel. Such a pushing mechanism is provided in a hole made in the housing. The mechanism consists of a prestressed spring sandwiched between an abutment integral with the housing and a pushing piece sliding in the hole, which comes into contact with the worm screw.

Although it makes it possible to reduce the play between the worm screw and the toothed wheel, such a mechanism requires the production of a hole having a very good surface condition due to the sliding of the thrust piece. In addition, the mounting of said mechanism requires the installation of the sliding pushing piece, the installation of a prestressed spring and the fastening of the abutment. Finally, the mechanism requires the presence of space, impacting the compactness of the housing.

The patent JP 20017204147 (NSK) reports a reducer system for power steering systems, a worm shaft is pivotably mounted relative to the casing using two ball bearings respectively disposed on a first proximal end connected to the motor, and a second distal end, the worm screw being prestressed against the toothed wheel using elastic means arranged between the bearing of the distal end and the casing.

However, the mounting of the worm screw, and the adjustment of the prestressing force is not easily achievable. The casing also requires the production of complex shapes in order to allow the positioning of the distal end.

The invention aims in particular to solve the aforementioned drawbacks.

A first object is to provide a power steering reduction device making it possible to reduce the play between the toothed wheel and the worm screw.

A second object is to provide a power steering reduction device having a casing devoid of complex shapes to produce, and offering the smallest possible footprint.

A third object is to provide a reduction device offering easy mounting.

A fourth object is to provide a power steering system comprising a reduction device as presented above.

A fifth object of the invention is to provide a power-driven vehicle, such as an automobile, including such a power steering system.

To this end, it is provided, first, an electric power steering reduction device comprising a support, a worm screw, as well as a toothed wheel, the toothed wheel meshing on a helical spline arranged on the worm screw, the worm screw comprising a first end capable of being driven in rotation, and a second free end, the first end and the second end respectively receiving a first rotational guiding means and a second rotational guiding means, so to make the worm screw pivotable relative to the support, the second rotational guiding means comprising a damping sleeve and a rotational guiding device, the sleeve surrounding the rotational guiding device, the second rotational guiding means comprising a centering means incorporating a press-fitting part inserted within the rotational guiding device, and a fastening part integral with the support.

The power steering reduction device allows to limit the play between the worm screw and the toothed wheel occurring due to the wear of the meshing mechanism or due to changes in the dimensions of the pieces following thermal stresses, while remaining compact and easy to obtain.

According to one embodiment, the second end comprises a cavity having a shape complementary to the damping sleeve, the damping sleeve being positioned to be inserted into the cavity.

According to one embodiment, the support comprises an orifice receiving the fastening part.

According to one embodiment, the orifice is cylindrical and defines a centering axis, the first rotational guiding means pivoting along an axis of rotation, the orifice being disposed so that an offset is created between the centering axis and the axis of rotation, the worm screw exerting a pushing force on the toothed wheel.

According to one embodiment, the centering means is a cylindrical pin.

According to one embodiment, the rotational guiding device is a needle bearing cage or a drawn cup needle bearing.

According to one embodiment, the support is a casing forming a housing surrounding the worm screw, the toothed wheel, the rotational guiding means.

Secondly, an electric power steering system is provided comprising a reduction device as presented above and an electric motor having a rotating shaft integral with the first end.

Thirdly, a motor vehicle is provided comprising the electric power steering system as presented above.

Other characteristics and advantages of the invention will appear more clearly and concretely on reading the following description of embodiments, which is made with reference to the appended drawings in which.

Figure 1:
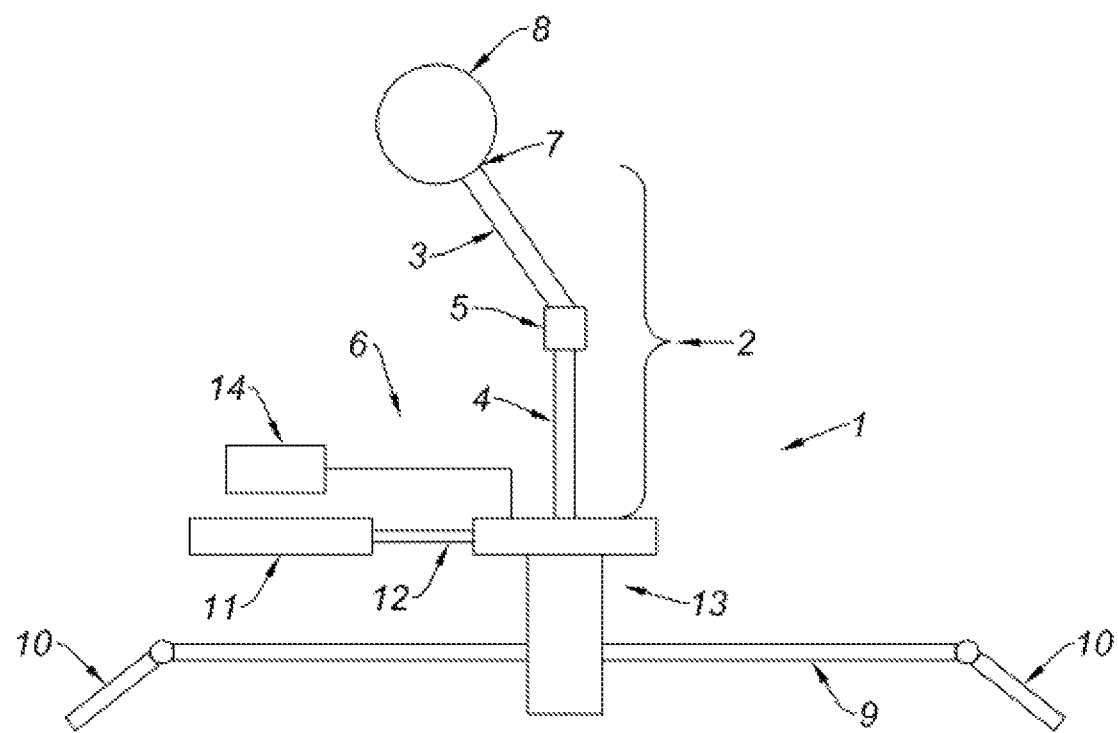
FIG. 1 represents an overall schematic view of a power steering system.
Figure 2:
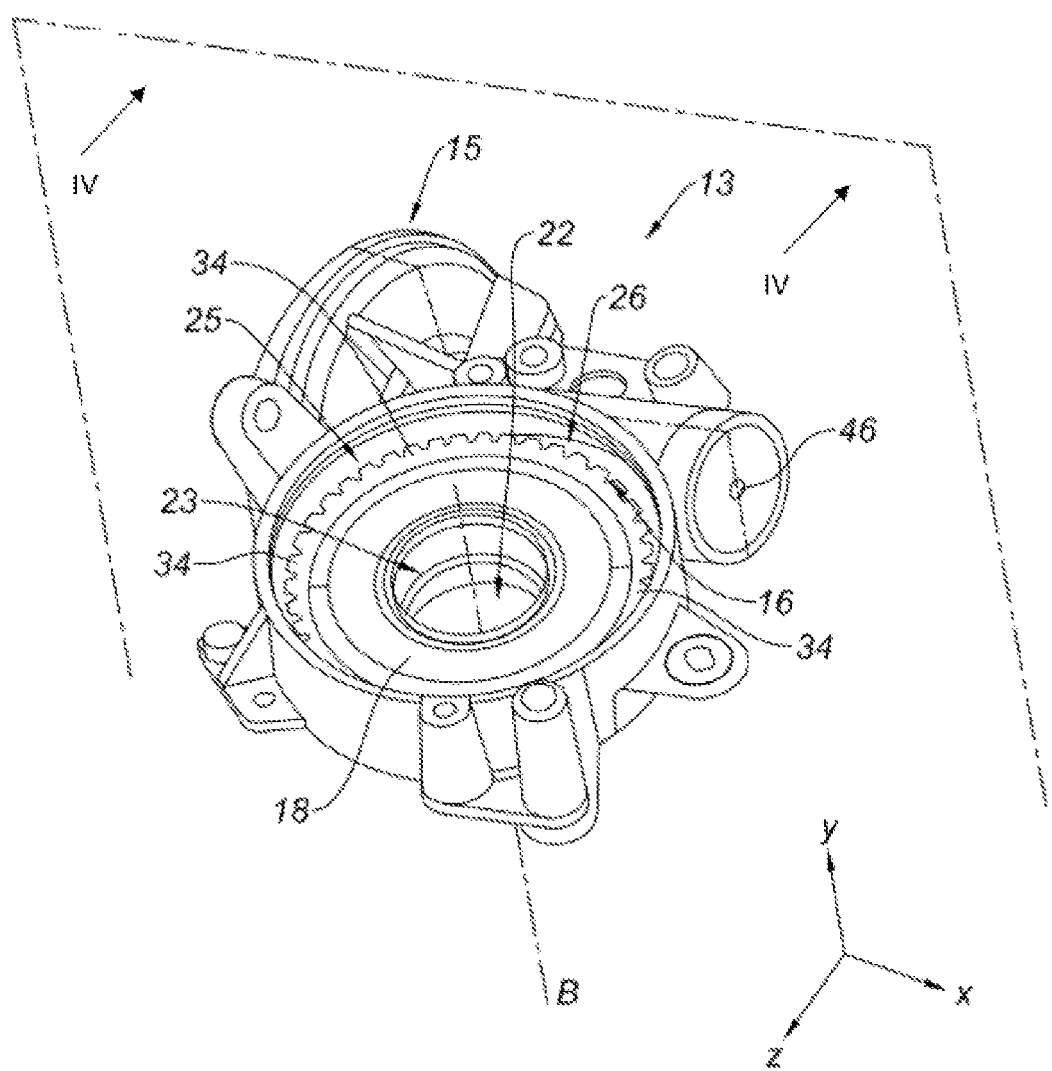
FIG. 2 represents a schematic perspective view of a reduction device.

An example of electric power steering system 1 is shown in FIG. 1.

A motor vehicle (not shown) incorporates for example such an electric power steering system 1. By motor vehicle, reference is made to any power-driven vehicle provided with four wheels and intended to run on a road infrastructure, for example a passenger car, a truck, or a coach.

The electric power steering system 1 aims to facilitate the handling of a directional steering wheel 8 by allowing the application of a torque generated by a rotating shaft 12 of a motor 11 applied to the steering column assembly 2 through a reduction device 13.

The reduction device 13 will now be described with more particular reference to FIGS. 2 to 5.

The reduction device 13 comprises a support 15, and a gear 16 comprising a worm assembly 17 and a toothed wheel 18.

As explained later in the description, the worm assembly 17 comprises a worm screw 19 and rotational guiding means 20, 21 making it possible to make the worm screw 19 pivotable relative to the support, for example along an axis A. The toothed wheel 18 is pivotably mounted along an axis B, orthogonal to the axis A, using known means, but not detailed in the present description.

According to the embodiments shown, the toothed wheel 18 is provided with an opening 22, so as to allow the introduction of a lower steering column 4. The opening 22 is advantageously covered with projections 23 complementary to recesses of the lower steering column 4, making the rotational movement of the toothed wheel 18 integral with the lower steering column 4.

Advantageously, the support 15 is in the form of a housing or casing enveloping the gear 16. In this way, the gear 16 is protected from external impurities and dirt which could risk seizing the movement.

Figure 3:
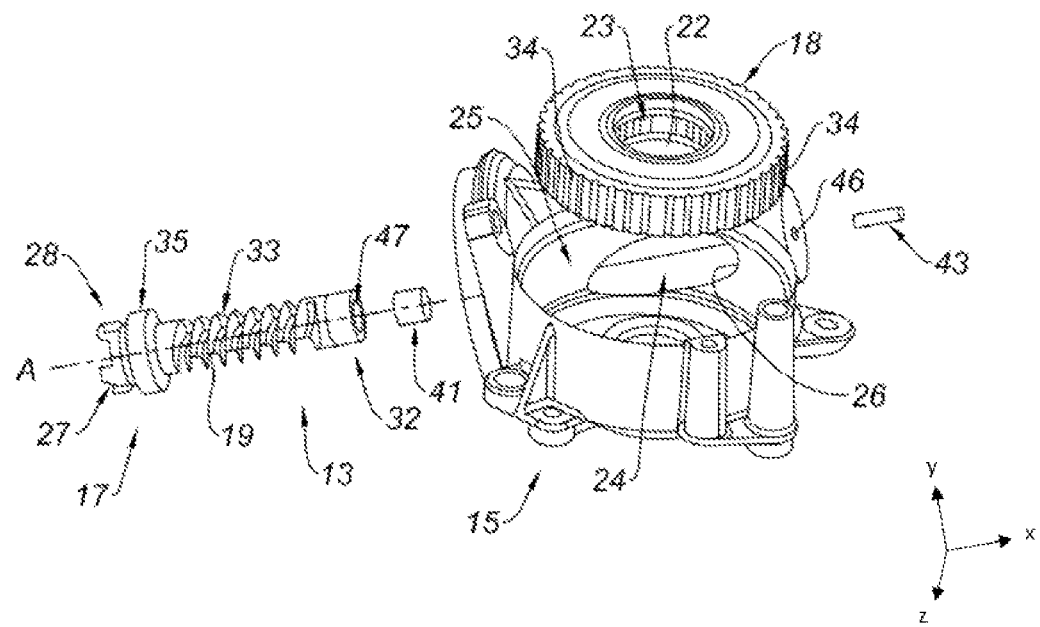
FIG. 3 represents a schematic exploded perspective view of a reduction device.
Figure 4:
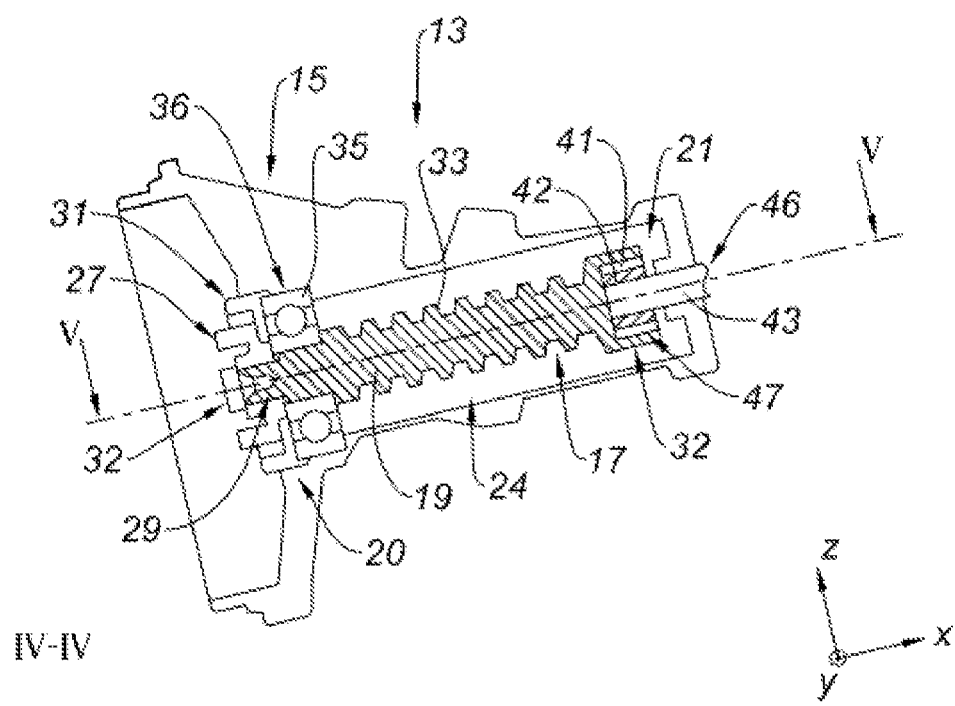
FIG. 4 represents a cross-sectional schematic view according the sectional plane III-III of FIG. 2 of the reduction device.

As can be seen in FIG. 3, the support 15 advantageously comprises a first compartment 24 allowing the installation of the worm screw 19, and a second compartment 25 allowing the arrangement of the toothed wheel 18. The compartments 24, 25 are disposed side by side, and communicate through an aperture 26 allowing the production of a mesh between the toothed wheel 18 and the worm screw 19.

In the embodiments shown in the figures, the support 15 is in one piece and is obtained for example by molding.

In other embodiments not shown, the support 15 is produced by assembling several pieces.

The worm screw 19 is for example coupled to a rotating shaft 12 of the motor 11 through a coupling piece 27, and meshes with the toothed wheel 18, which allows transmission of the rotational movement. The diameter of the toothed wheel is defined so as to allow the reduction of the speed of rotation coming from the motor 11, and the obtaining of a torque large enough to contribute to driving the steering column assembly 1. In this way, such a reduction device 13 is able to relieve the user of the effort required to pivot the wheels of a vehicle equipped with an electric power steering system 1.

With respect to the worm screw 19 an orthogonal coordinate system XYZ constituting a trihedron is defined, comprising three axes perpendicular in pairs, namely:

an axis X which defines a longitudinal, horizontal direction, substantially defining the general direction of extension of the worm screw 19.

an axis Y defining a transverse, horizontal direction, which defines with the axis X a horizontal plane XY, an axis Z, defining a vertical direction, perpendicular to the horizontal plane XY.

The worm screw 19 has a first end 28 advantageously carrying the coupling piece 27 integral with the motor 11, through a rotating shaft 12. In this way, the rotational movement of the motor 11 is transmitted to the worm screw 19.

Advantageously, in order to make the coupling piece 27 integral with the worm screw 19, the first end 28 is advantageously provided with a positioning surface 29 made on a cylinder 30 projecting from the first end 28. Such an arrangement allows the positioning of the coupling piece 27 within the first end 28, the holding in position being ensured for example by means of a fastening piece 31.

The worm screw 19 has a second end 32, advantageously free.

So as to allow meshing on the toothed wheel 18, the worm screw has a helical spline 33 advantageously disposed between the two ends 28, 32. The helical spline 33 is formed, for example, of a helix engaged on teeth 34 of the toothed wheel 18.

Figure 5:
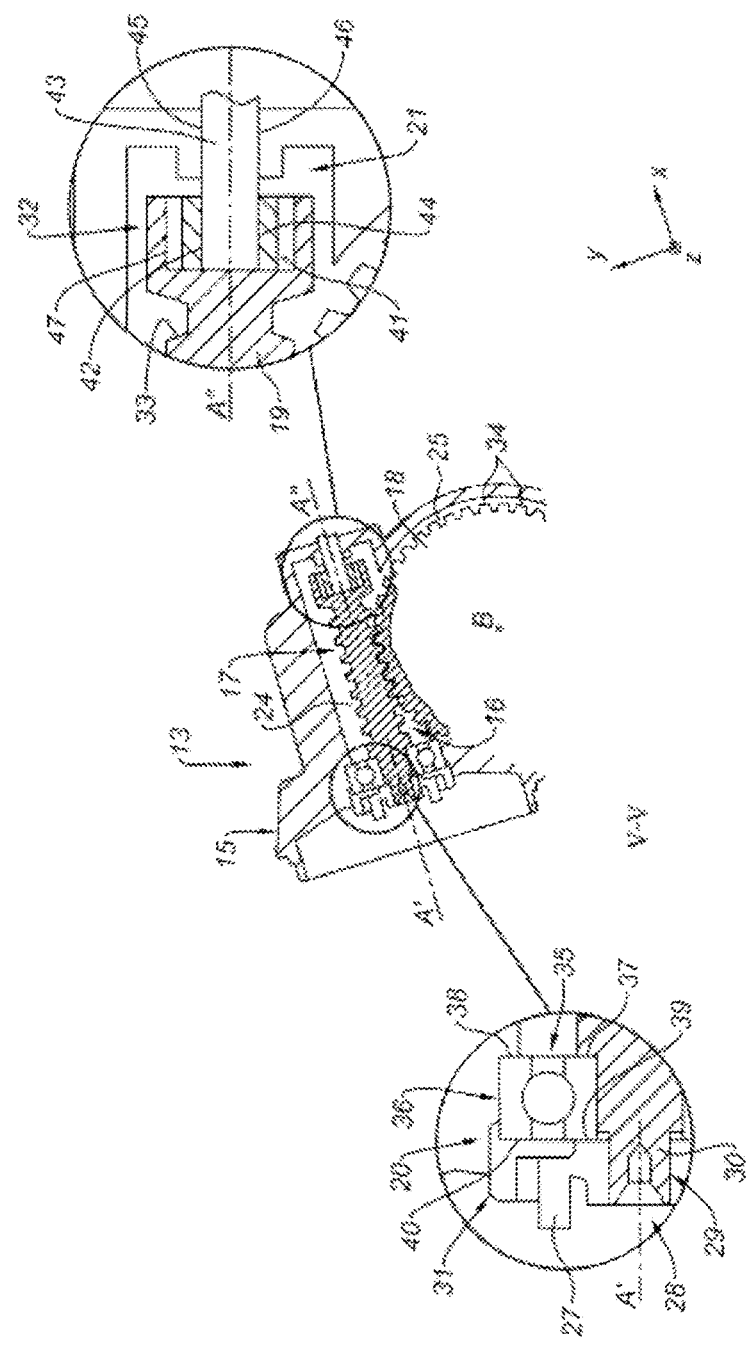
FIG. 5 represents a cross-sectional schematic view according to the sectional plane V-V of FIG. 4, with medallions schematically representing details of the rotational guiding means.

The rotational guiding means will now be described with more particular reference to FIG. 5. Advantageously, a first rotational guiding means 20 and a second rotational guiding means 21 are respectively disposed on the first end 28 and the second end 32 of the worm screw 19.

The first rotational guiding means 20 incorporates for example a ball bearing 35, disposed between the first end 28 and a hole 36 provided in the support 15, providing a pivot connection of axis A' between the support 15 and the first end 28.

In order to allow the positioning and holding in position of the ball bearing 35 on the first end 28, the helical spline 33 has a shoulder 37, and the hole 36 has a bracket 38, which makes it possible to make stops respectively for each of the rings of the bearing 35. The holding in position is ensured thanks to a first stop surface 39 arranged on the coupling piece 27, and a second stop surface 40 provided on the fastening piece 31.

The second rotational guiding means 21 includes a damping sleeve 41, a rotational guiding device 42, and a centering means 43, which together allow the production of a pivot connection between the support 15 and the second end 32, according to a centering axis A".

Advantageously, the damping sleeve 41, the rotational guiding device 42, and the centering means are cylindrical and nested in one another, which makes it possible to obtain a minimum footprint of the second rotational guiding means 21.

The centering means comprises a press-fitting part 44 inserted within the rotational guiding device 42, the press-fitting part 44 acting for example as a male part and the rotational guiding device 42 as the female part. In such a configuration, the press-fitting part 44 carries the rotational guiding device 42. The centering means comprises a fastening part 45 integral with the support 15, which is for example press-fitted into an orifice 46 formed in the support 15. The position of such an orifice 46 thus makes it possible to define the position of the axis A" with respect to the axis A'.

Advantageously, the second axis A" is disposed offset from the first axis A', being positioned in such a way that the worm screw 19 exerts a push against the toothed wheel 18. In this way, it is made a prestressing mounting of the worm screw 19 on the toothed wheel 18.

Thanks to such a prestressing mounting of the gear 16, the worm screw 19 is constantly in contact with the toothed wheel 18, which makes it possible to avoid the appearance of any parasitic play, both due to wear of the gear 16 as well as deformations of the worm assembly 17 or of the toothed wheel 18 caused by thermal variations.

The damping sleeve 41 exerts a return force when biased. Thus, such a sleeve 41 allows the direction of extension of the axis A" to vary following the wear of the gear 16 or the deformations of the helical spline 33 or of the teeth 34 linked to thermal variations. Thus, the damping sleeve 41 varies the direction of extension of the worm screw 19 so as to exert a push of the worm screw 19 against the toothed wheel 18. Any radial parasitic play is thus eliminated.

The damping sleeve 41 is for example made of a synthetic polymer material, for example elastomer, or of natural rubber. Such a damping sleeve 41 is compact, inexpensive, and easy to install on the rotational guiding device 42. In this way, the footprint and the manufacturing complexity of the reduction device 13 are limited.

Advantageously, the rotational guiding device 42 is a bearing, for example a rolling bearing such as a drawn cup needle bearing or a needle bearing cage, which makes it possible to authorize a deviation of the axis of rotation A' along a transverse axis, caused for example by the deviation generated by the prestressing mounting of the worm screw 19. In addition, such a rotational guiding device 42 also offers the advantage of being compact, inexpensive, and easy to install on the rotational guiding device 42. In this way, the footprint and the manufacturing complexity of the reduction device 13 are limited.

The centering means 43 is advantageously produced in cylindrical form, which facilitates the production of the pivot connection between the second end 32 and the support 15. Such an arrangement also allows the ability to offset the centering axis A" according to the directions Y, Z alone or combined, that is to say radially.

In the embodiments shown, the centering means 43 comprises a cylindrical pin. The use of a cylindrical pin makes it possible to have a centering means performing both the function of setting and holding the fastening part in position on the support 15. The number of pieces to be used to produce the centering means 43 is thus reduced. Furthermore, the mounting of the second rotational guiding means 21 is facilitated.

Advantageously, the worm screw 19 has a cavity 47 hosting the second rotational guiding means 21. The cavity 47 is for example cylindrical having a shape and a dimension complementary to the sleeve 41. In this way, the footprint of the sleeve 41, of the rotational guiding device 42, and of the press-fitting part 44 are limited. The size of the reduction device 13 is thus limited, which in particular facilitates the production of the support 15, since apart from the production of the hole 36, the aperture 26 and the orifice 46, no other particular additional geometry must be made within the first compartment 24.

The reduction device 13 as presented above has many advantages, in particular:
- a reduced play between the toothed wheel 18 and the helical spline 33,
- a small footprint,
- a simple mounting, with a reduced number of operations
- a relatively limited manufacturing cost of the support 15, in particular due to the absence of complex shapes, and
- a saving in material in particular due to the limited footprint of the second rotational guiding means 21.

The invention claimed is:

1. An electric power steering reduction device comprising a support, a worm screw, as well as a toothed wheel, the toothed wheel meshing on a helical spline arranged on the worm screw, the worm screw comprising a first end adapted to be driven in rotation, and a second free end, the first end and the second end receiving respectively a first rotational guiding means and a second rotational guiding means, so as to make the worm screw pivotable with respect to the support, the second rotational guiding means comprising a damping sleeve and a rotational guiding device, the sleeve surrounding the rotational guiding device, the reduction device being wherein the second rotational guiding means comprises a centering means incorporating a press-fitting part inserted within the rotational guiding device, and a fastening part integral with the support.

2. The reduction device according to claim 1, wherein the second end comprises a cavity having a shape complementary to the damping sleeve, the damping sleeve being positioned to be inserted into the cavity.

3. The electric power steering reduction device according to claim 1, wherein the support comprises an orifice receiving the fastening part.

4. The reduction device according to claim 3, wherein the orifice is cylindrical and defines a centering axis, the first rotational guiding means pivoting about an axis of rotation, the orifice being disposed so that an offset is created between the centering axis and the axis of rotation, the worm screw exerting a push force on the toothed wheel.

5. The reduction device according to claim 4, wherein the centering means is a cylindrical pin.

6. The reduction device according to claim 1, wherein the rotational guiding device is a needle bearing cage or a drawn cup needle bearing.

7. The reduction device according to claim 1, wherein the support is a casing forming a housing surrounding the worm screw, the toothed wheel, the rotational guiding means.

8. An electric power steering system comprising a reduction device according to claim 1, and an electric motor having a drive shaft integral with the first end.

9. A motor vehicle comprising the power steering system according to claim 8.

\* \* \* \* \*